(12) United States Patent
Coulon et al.

(10) Patent No.: US 8,910,675 B2
(45) Date of Patent: Dec. 16, 2014

(54) METHOD AND VALVE FOR THE VENTING OF A SADDLE FUEL TANK

(71) Applicant: Inergy Automotive Systems Research (Societe Anon.), Brussels (BE)

(72) Inventors: Philippe Coulon, Rantigny (FR); Sebastien Jouie, Compiegne (FR); Remi Thebault, Le Plessis Brion (FR); Pierre Lacome, Lachelle (FR); David Hill, Commerce Township, MI (US); Joseph Douglas Chiasson, Royal Oak, MI (US)

(73) Assignee: Inergy Automotive Systems Research (Societe Anonyme), Brussels (BE)

( * ) Notice: Subject to any disclaimer, the term of this patent is extended or adjusted under 35 U.S.C. 154(b) by 22 days.

(21) Appl. No.: 13/855,236

(22) Filed: Apr. 2, 2013

(65) Prior Publication Data

US 2013/0255797 A1    Oct. 3, 2013

Related U.S. Application Data

(60) Provisional application No. 61/619,487, filed on Apr. 3, 2012.

(30) Foreign Application Priority Data

Apr. 3, 2012    (EP) .................................... 12162989

(51) Int. Cl.
*B65B 1/04*    (2006.01)
*B60K 15/03*    (2006.01)
*B60K 15/035*    (2006.01)

(52) U.S. Cl.
CPC . *B60K 15/03519* (2013.01); *B60K 2015/03276* (2013.01); *B60K 2015/03514* (2013.01);

(Continued)

(58) Field of Classification Search
CPC .............. B60K 15/03519; B60K 2015/03576; F02M 37/0094
USPC ........ 141/301, 198, 59, 286, 94–95; 137/142, 137/143, 587, 202, 199, 386; 280/833, 7; 220/4.14, 746
See application file for complete search history.

(56) References Cited

U.S. PATENT DOCUMENTS 4,703,771 A * 11/1987 Mimura ......................... 137/142

(Continued)

FOREIGN PATENT DOCUMENTS

DE    100 60 239 A1    6/2002
EP    2 045 111 A2    4/2009

OTHER PUBLICATIONS

European Search Report issued Oct. 30, 2012, in European Patent Application No. 12162989.3, filed Apr. 3, 2012.

*Primary Examiner* — Timothy L Maust
*Assistant Examiner* — Timothy P Kelly
(74) *Attorney, Agent, or Firm* — Oblon, Spivak, McClelland, Maier & Neustadt, L.L.P.

(57) ABSTRACT

A method for venting of a liquid tank with a valve, a primary compartment and a secondary compartment which are connected together via a bridge. The valve includes a chamber provided with a cover, which extends at least partly into the tank and is connected via an upper venting aperture to a venting circuit. A first device monitors a level of liquid in the primary compartment. A second device monitors a level of liquid in the secondary compartment. The valve configured to be closed when the first device detects that the level of liquid in the primary compartment is equal to or higher than a first predetermined filling level, and the second device detects that the level of liquid in the secondary compartment is equal to or higher than a second predetermined filling level.

14 Claims, 6 Drawing Sheets

(52) U.S. Cl.
CPC .............. *B60K 2015/03388* (2013.01); *B60K 2015/03223* (2013.01); *B60K 2015/03523* (2013.01); *B60K 2015/03368* (2013.01); *B60K 2015/03118* (2013.01)
USPC ............ 141/198; 141/301; 141/95; 280/833; 220/4.14; 137/587; 137/199; 137/386

(56) References Cited

U.S. PATENT DOCUMENTS

| | | | | |
|---|---|---|---|---|
| 6,557,595 | B2 * | 5/2003 | Ozaki | 141/301 |
| 6,604,539 | B1 * | 8/2003 | Strohmayer et al. | 137/43 |
| 6,957,658 | B2 * | 10/2005 | Aschoff et al. | 137/202 |
| 7,614,854 | B2 * | 11/2009 | Palvolgyi | 417/36 |
| 8,226,123 | B2 * | 7/2012 | Chino et al. | 280/830 |
| 8,353,322 | B2 * | 1/2013 | Pozgainer et al. | 141/303 |
| 8,622,074 | B2 * | 1/2014 | Hochstein et al. | 137/202 |
| 2001/0013516 | A1 | 8/2001 | Boecker | |
| 2007/0189906 | A1 | 8/2007 | Palvolgyi | |
| 2009/0085342 | A1 | 4/2009 | Chino et al. | |

* cited by examiner

METHOD AND VALVE FOR THE VENTING OF A SADDLE FUEL TANK

FIELD OF THE INVENTION

The present invention relates to a method and a valve for the venting of a liquid tank, in particular a saddle fuel tank with which a motor vehicle may be equipped.

PRIOR ART

Saddle fuel tanks are widely used for automotive applications. They are most frequently used with rear wheel drive or four wheel drive vehicles and they are designed to hold more fuel than a standard fuel tank.

Generally, saddle fuel tanks include two compartments for storage of fuel, which are connected together in a communicating manner by means of a bridge. The bridge provides an exterior concavity which is intended to provide accommodation for drive and/or exhaust components of the vehicle to pass freely therethrough. Saddle fuel tanks, as most of the fuel tanks for motor vehicles, are nowadays generally provided with a venting circuit. This circuit allows air to be introduced into the tank in the event of underpressure (especially for compensating for the volume of liquid consumed) or allows the gases contained in the tank to be removed in the event of overpressure (especially in the event of overheating). This circuit also allows the ducting and possible filtering of the gases that have to be discharged into the atmosphere, for the purpose of meeting the ever stricter environmental requirements in this regard.

The venting circuit generally includes a valve of the ROV (roll-over valve) type which as far as possible prevents liquid from coming out of the tank in the event of said tank rolling over or being at an excessively high angle of inclination. This valve must also respond rapidly and reliably when its intervention conditions occur, but with minimum sensitivity to abnormal phenomena such as especially a very high flow rate, overpressure in the tank or low-amplitude waves. This type of valve thus includes a vent function, a roll-over function and a liquid discrimination function.

The venting circuit may also include a valve of the FLV (fill limit valve) type which sets the maximum filling level of the tank. It provides thus the fill-limit function.

Some valves provide the functions from both an ROV and from a FLV. They are called FLVV (fill limit vent valve).

Saddle tanks include a main (or primary) compartment and a secondary compartment, and include a transfer system that is in charge of transferring the liquid from the secondary compartment into the main compartment by mean of the fuel pump. This transfer system is continuously active as soon as the fuel pump is active, which means as soon as the contact is on.

The transfer system implies that in a regular vehicle usage, the secondary compartment will have liquid in only if the main compartment is full. This configuration will lead to a so called "regular filling".

However, an important transverse acceleration of the vehicle can transfer an important mass of liquid from the main compartment into the secondary compartment by mean of its own inertia submitted to this acceleration. If the contact is off at this moment, it results some liquid in the secondary compartment (possibly up to the level of the bridge) while the main compartment isn't full (possibly totally empty). This configuration will lead to a so called "rental-car filling".

Generally, the fill limit valve of a saddle tank has a shut-off level (i.e. the level from which the valve takes a closed position) which is set above the level of the bridge. In this case whatever is the filling configuration in the two compartment, the filling behaviour will be the following; the tank is filled into the main compartment, when this one overflows, the secondary compartment is filled. When both compartments are full, the liquid rise up in the tank until the fill limit valve stops the filling process.

However it happens that in some situation, constrained by the vehicle chassis or other OEM requirement, the shut-off level of the fill limit valve is set below the bridge level.

In this situation, in order for a "regular filling" to be performed, the tank needs to have the fill limit valve positioned in the secondary compartment (the fill limit valve having its shut-off level set below the bridge level). However, in the case of a "rental-car filling", when the level of liquid in the secondary compartment is equal or above the shut-off level of the fill limit valve, the filling process stops (i.e. refueling of the main compartment is not possible, since the fill limit valve is closed).

To overcome this problem, a known solution consists in disposing a first fill limit valve within the main compartment of the saddle tank (the one in which the filler pipe flows) and a second fill limit valve within the secondary compartment of the saddle tank. The shut-off level (i.e. the level from which the valve takes a closed position) of each valve is set below the level of the top of the bridge. The refueling of the saddle tank is possible until both valves are closed. This known solution ensures a complete filing of the saddle tank in any of the two previously mentioned situations of refueling.

Disadvantages of this known solution are the complexity of the architecture and its expense since there are two valves to be mounted within the fuel tank. The complexity of this known solution is further increased by the fact that a plurality of conduits needs to be implemented for maintaining the two valves at the desired positions within the compartments and for making them communicate with the conduit that runs to a vapour storage canister. Fuel vapours are routinely vented to the canister from which they are later purged and burned.

In view of the above-mentioned disadvantages, there exists a need for an improved method and valve for the venting of a saddle fuel tank.

SUMMARY OF THE INVENTION

An object of the present invention is to solve these above-mentioned problems by proposing a method for venting of a liquid tank, the tank comprising a valve, a primary compartment and a secondary compartment which are connected together in a communicating manner by means of a bridge. According to one aspect of the present invention, the valve comprises:
a) a chamber provided with a cover, which extends at least partly into the tank and is connected via an upper venting aperture to a venting circuit;
b) first means for monitoring a level of liquid in the primary compartment;
c) second means for monitoring a level of liquid in the secondary compartment; the valve being configured to be closed when:
said first means detect that the level of liquid in the primary compartment is equal to or higher than a first predetermined filling level; and
said second means detect that the level of liquid in the secondary compartment is equal to or higher than a second predetermined filling level.

Thus, it is proposed to use a single valve for monitoring the level of liquid in both compartments of the tank. The valve according to the present invention is configured in such a way that both compartments are filled at a desired filling level in both "regular" and "rental car" refueling configurations.

The valve according to the present invention is equipped with two means for monitoring which confer on it the ability to work with two shut-off levels (i.e. first predetermined filling level and second predetermined filling level). So, the valve according to the present invention has the particularity to be triggered as a function of two shut-off levels. These shut-off levels can be set at the same level or at two different levels. The refueling of the tank is then possible until both shut-off levels are reached. When both shut-off levels are reached, the valve takes a closed position.

By the term "closed" is meant the fact that the communication between the inner volume of the tank and the upper venting aperture is obstructed/no longer active so that the tank can no longer be vented by the valve.

The valve is intended for the venting circuit of a tank that may contain any liquid. In particular, the liquid may be a fuel, a brake fluid or a lubricant. More particularly, the liquid is a fuel. The tank may be intended for any use, especially for equipping a vehicle and even more especially for equipping a motor vehicle.

The valve according to the invention comprises a chamber of any shape, usually of constant internal cross section. It preferably has a substantially cylindrical internal cross section. In an advantageous embodiment, the cover of the valve is pierced by an orifice preferably intended to be sealed by a float or any other sealing device preferably providing a ROV function as explained above.

In one particular embodiment, the first and second means for monitoring are mechanical elements such as, for example, linear and/or curved plastic conduits.

In another particular embodiment, the first and second means for monitoring are electronic sensors (for example, gage sensors)

For a given tank having a given maximum filling volume, it is possible to advantageously set the shut-off levels of the valve according to the invention below the level of the bridge in order to make a new filling volume version requirement out of the same tank. For example, considering a tank with a maximum filling volume of 85 liters (with fill level above the level of the bridge), it is possible to reduce this maximum filling volume to 78 liters (with fill level below the level of the bridge), by setting appropriately the first and second predetermined filling levels below the top of the bridge.

In a preferred embodiment, the valve is mounted within the tank such that its chamber extends above the bridge. The on-board diagnostic (OBD) for detecting leak in the fuel system requires the valve (that makes the tank to communicate with the canister) to be opened. The advantage of the configuration where the chamber of the valve extends above the bridge is that the valve can remain open at an excessively high angle of inclination of the tank, provided that the maximum filling level of the tank is not reached.

In an advantageous embodiment, said first means comprise a first venting tube having one extremity (also called hereafter "inlet") which opens into the primary compartment at a level which corresponds to the first predetermined filling level, and an other extremity (also called hereafter "outlet") which opens into the chamber, and said second means comprise a second venting tube having one extremity (also called hereafter "inlet") which opens into the secondary compartment at a level which corresponds to the second predetermined filling level, and an other extremity (also called hereafter "outlet") which opens into the chamber. Here, it is proposed a dual port valve, i.e. a valve equipped with two gas inlets (i.e. the extremities of the tubes that open into the primary and secondary compartments). These gas inlets are located away from the chamber of the valve, so as to extend at the desired levels in the compartments of the tank. For this aim, the valve is advantageously equipped with two venting tubes. The tubes can have the same length or different lengths. The functional dimensions of those tubes are their inner section (which will set a pressure drop between the two extremity of the tubes, and the velocity of the fluids inside the tubes) and the height of their inlets (which will set the predetermined fill level). Such architecture is compact and easy to implement. The term "gas" is understood in particular to mean the external air that has to be introduced into the tank or the gas mixtures contained in the tank, the removal of which has to be possible. In the case of a fuel tank, these gas mixtures comprise essentially air, and fuel vapour.

Advantageously, the valve comprises a base designed for supporting the first and second venting tubes and for connecting them to the chamber of the valve. The base according to the invention may have any shape. It preferably has a substantially cylindrical internal cross section. Preferably, this base is a cup shape part, with a flat bottom. Advantageously, the base is designed to be clipped onto the chamber. In another embodiment, the base comprises a threaded portion designed to be screwed on a corresponding threaded portion of the chamber. The first and second venting tubes are placed in communication (i.e. connected) with the chamber of the valve via a common aperture (i.e. the lower aperture of the chamber which corresponds to the upper aperture in the cup shaped base.

In consequence, the flow of gas through this common aperture is possible until the lower extremity (i.e. the extremity that opened into a compartment) of both venting tubes are closed by the liquid.

Advantageously, the base, the first and second venting tubes form one block. This architecture is compact and facilitate mounting/dismounting operations. In another particular embodiment, this one block also includes the chamber.

In order to work properly, the valve must be entirely tight from the two inlets to the outlets. Otherwise there will be overfilling.

In a preferred embodiment, the inlet section of the tubes extends horizontally (with respect to the bottom of the tank) in order to have a clear and precise shut-off.

The tubes can be straight or curved. Curved tubes is advantageous in the way that it follows the shape of the bridge and doesn't extend too far in the compartments.

In a preferred embodiment, the base and the first and second venting tubes are made by injection moulding a plastic.

In a preferred embodiment, the first and second venting tubes are made of plastic. The term "plastic" is understood to mean any polymeric synthetic material, whether thermoplastic or thermosetting, which is in the solid state under ambient conditions, as well as blends of at least two of these materials.

The main function of the valve according to the invention is the fill-limit function, but advantageously, the valve according to the invention can include a roll-over function, a venting function and a liquid discrimination function. These functions can be implemented by using a device comprising a float within a housing with a spring or ball below it in order to make the float closing before 90° rotation. On the top of the float there is a seal (preferably elastomeric or plastic) that seals the vent orifice in the top part of the housing when the float is in shut position.

According to another aspect of the present invention, there is provided a saddle fuel tank equipped with a valve comprising first means for monitoring the level of liquid in a primary compartment of the tank and second means for monitoring the level of liquid in a secondary compartment of the tank, and being configured to be closed when:

the first means detect that the level of liquid in the primary compartment is equal to or higher than a first predetermined filling level; and the second means detect that the level of liquid in the secondary compartment is equal to or higher than a second predetermined filling level.

BRIEF DESCRIPTION OF THE DRAWINGS

The invention will be illustrated in a non limiting manner by FIGS. 1 to 6.

DESCRIPTION OF THE INVENTION

Figure 1:
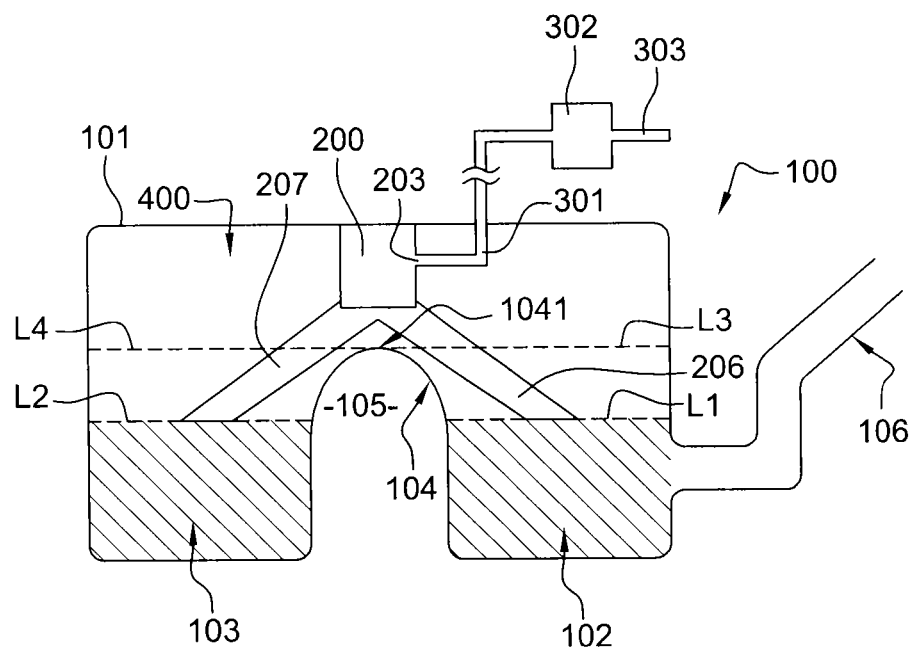
FIG. 1 is a schematic view of a fuel tank showing the maximum filling level of each of primary and secondary compartments of the fuel tank as well as the filling levels at which a valve according to the present invention is closed.

Referring now to the drawings, FIGS. 1 through 6 depict a preferred embodiment according to the present invention.

Each of FIGS. 1 through 6 depicts a sectional schematic view of a saddle fuel tank 100 having a tank shell 101. The tank shell 101 comprises a primary compartment 102, a secondary compartment 103 and a dome 400. The primary compartment 102 and the secondary compartment 103 are connected together in a communicating manner by means of a bridge 104. The bridge provides an exterior concavity 105 which is intended to provide accommodation for drive and/or exhaust components of the vehicle to pass freely underneath.

A tank filler pipe 106 provides an entry for fuel into the fuel tank 100, wherein the primary compartment 102 is identified as the compartment first filled by fuel introduced from the filer pipe 106.

A valve 200 is disposed within the fuel tank 100. Preferably, the valve 200 is positioned at the centre of the tank, such that it extends above the bridge 104.

Figure 6:
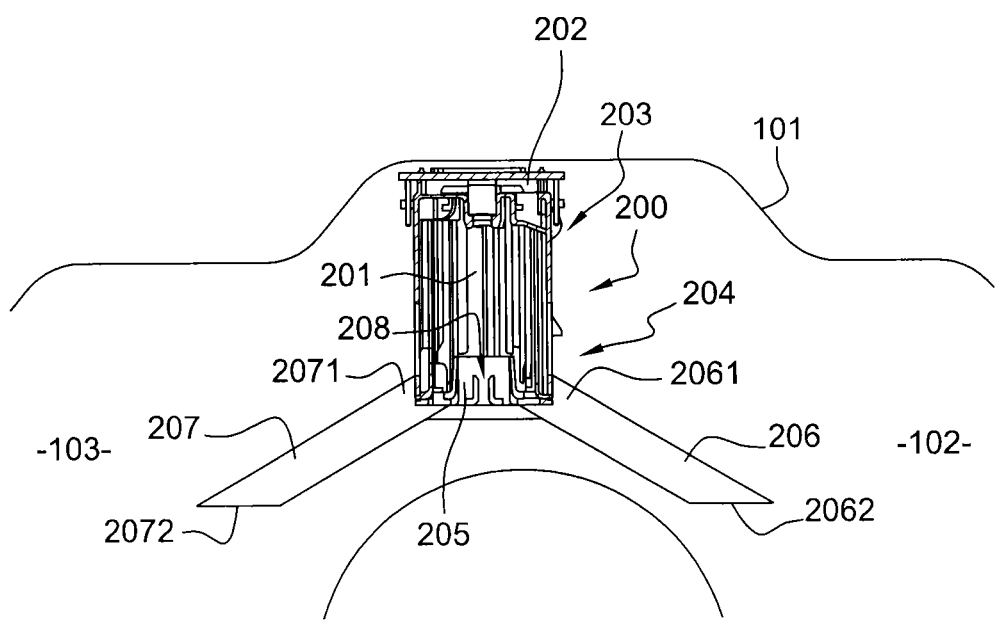
FIG. 6 shows a valve according to a preferred embodiment of the present invention (or at least one portion thereof).

Referring now to FIGS. 1 and 6. FIG. 6 shows the valve 200 according to a preferred embodiment of the present invention. The valve 200 comprises a chamber 201. The chamber 201 of the valve is provided with a cover 202, which may either be moulded as one part with said chamber or it may form a separate part joined to the latter by any known means (mechanical fastening with a seal; welding etc.). This cover 202 is advantageously connected to a venting circuit via an aperture 203. For example, the aperture 203 is connected through a conduit 301 to the inlet of a storage canister 302 (see FIG. 1). The storage canister 302 has an outlet conduit 303 adapted for connection to the air inlet of an engine.

In the example shown on FIG. 6, the valve 200 further comprises a refueling vent block 204. The refueling vent block 204 comprises:

a base 205 designed to be mounted at the bottom of the chamber 201;

a first venting tube 206 in charge of monitoring a level of fuel in the primary compartment 102; and a second venting tube 207 in charge of monitoring a level of fuel in the secondary compartment 103.

In the illustrated example, the first venting tube 206 and the second venting tube 207 are linear tubes and are arranged one to another such that they form an inverted "V". For example, the tubes can have internal section comprised between 200 mm$^2$ and 250 mm$^2$. The angle of the tubes can be defined so that a clearance of, for example, 10 mm is let between the tubes and the bridges.

In an alternative embodiment, the first venting tube 206 and the second venting tube 207 are curved tubes and are arranged one to another such that they form an inverted "U". As mentioned earlier curved tubes would be advantageous in the sense that they optimize both clearance, length and weight balance of the tubes.

The base 205 is fixed to the chamber by any known means (clips, screws . . . ). The base 205 is advantageously connected to (i.e. in communication with) the chamber 201 via an aperture 208. One extremity 2061 of the first venting tube opens onto the base 205 and an other extremity 2062 of the first venting tube opens onto the primary compartment 102. The extremity 2062 corresponds to a first shut-off level or first predetermined filling level L1. One extremity 2071 of the second venting tube opens onto the base 205 and an other extremity 2072 of the second venting tube opens onto the secondary compartment 103. The extremity 2072 corresponds to a second shut-off level or second predetermined filling level L2. In a preferred embodiment, the base 205 and the venting tubes 206 and 207 are made of plastic.

As shown in FIG. 1, the valve 200 according to a preferred embodiment of the present invention is designed to respond by taking a fully closed position when:

a fuel level in the primary compartment 102 is equal to or higher than the first predetermined filling level L1; and a fuel level in the secondary compartment 103 is equal to or higher than the second predetermined filling level L2.

The first predetermined filling level L1 is lower than the maximum filling level L3 of the primary compartment 102, which corresponds to the level of the top 1041 of the bridge 104.

The second predetermined filling level L2 is also lower than the maximum filling level L4 of the secondary compartment 103, which corresponds to the level of the top 1041 of the bridge 104.

As will be described below, the valve 200 according to a preferred embodiment of the present invention comprises means for providing both the ROV function and the FLVV function.

In the illustrated embodiment, the volume of the two compartments 102 and 103 are the same, and the predetermined filling level L1 of the primary compartment 102 and the predetermined filling level L2 of the secondary compartment 103 are at the same level. It will be noted however that L1 and L2 may be at different levels, and especially when the volume of the two compartments are different.

Figure 3:
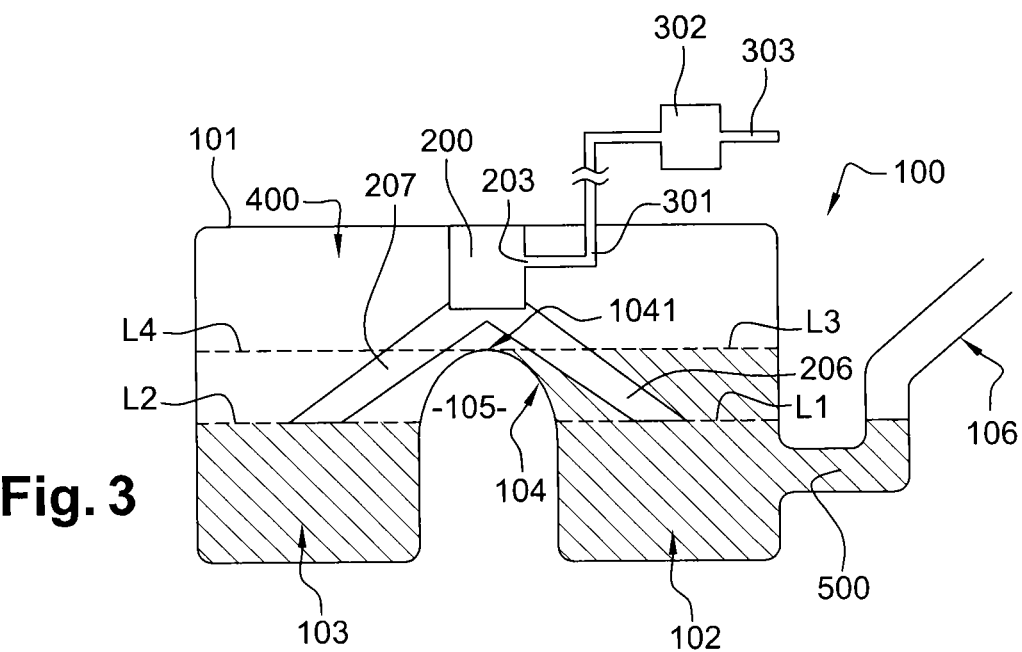
FIG. 3 shows the fuel tank is filled, in which the maximum filling level has been reached in the secondary compartment, causing the stop of the refueling procedure.
Figure 5:
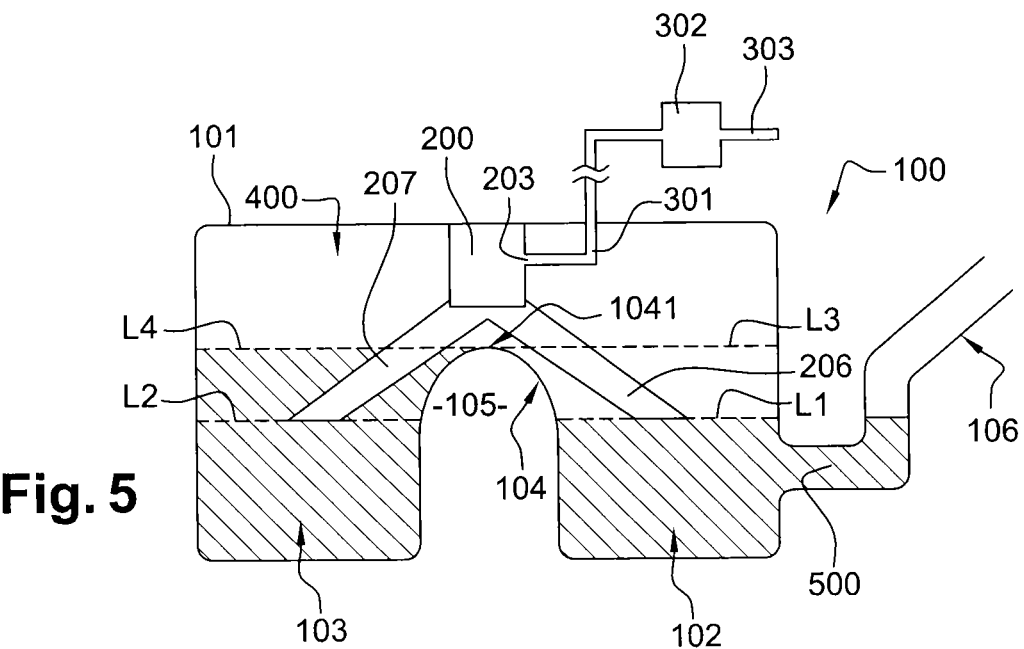
FIG. 5 shows the fuel tank is filled, in which the maximum filling level has been reached in the primary compartment, in the situation shown in FIG. 4, causing the stop of the refueling procedure.

As will be later described, refueling of the fuel tank 100 is possible until the valve 200 responds as indicated in the case of FIG. 3 or in the case of FIG. 5. In the case of FIG. 3, the second predetermined filling level L2 is reached and the fuel tank 100 is filled. In the case of FIG. 5, the first predetermined filling level L1 is reached and the fuel tank 100 is filled.

Consideration will now be given to the fuel tank 100 in a situation in which the level of liquid is below L2 in the secondary compartment ("regular" refueling procedure). Fuel 500 enters the primary compartment 102 from the tank filler pipe 106 in a refueling procedure, initiating filling of the primary compartment 102. When the level of fuel 500 reaches the first predetermined filling level L1, the valve 200 remains open, as the second predetermined filling level L2 is not reached. In other words, the extremity 2072 of the second venting tube is still open. Because the valve 200 is open, the level of fuel 500 exceeds the first predetermined filling level L1.

Figure 2:
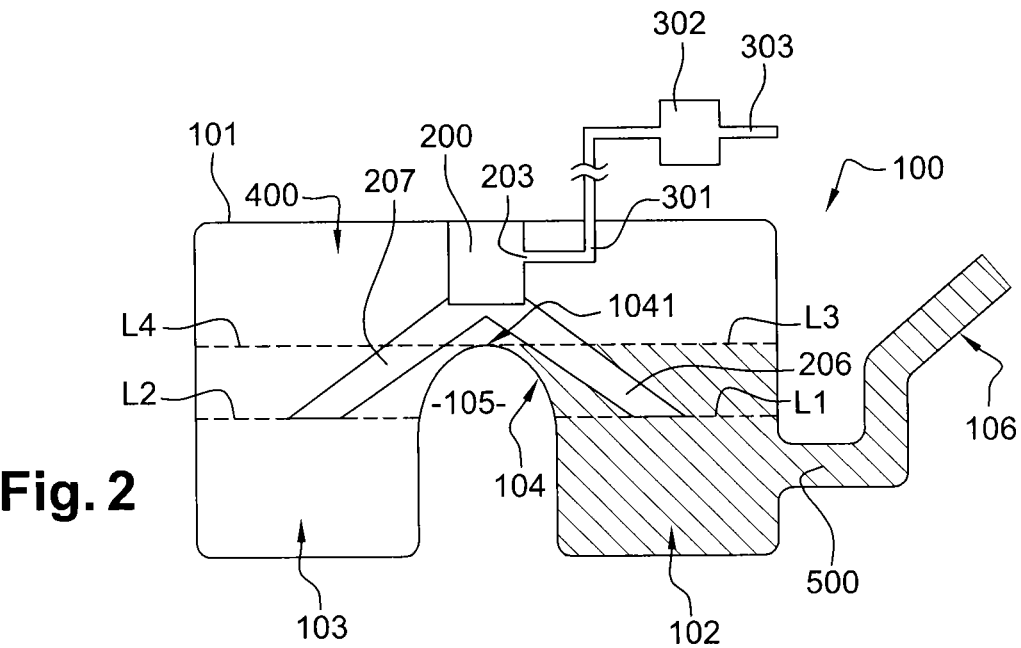
FIG. 2 is a schematic view of the fuel tank of FIG. 1 showing a situation in which the maximum filling level has been reached in the primary compartment during a refueling procedure.

Reference will now be made particularly to FIG. 2 showing the fuel tank 100 in the course of the refuelling procedure in a situation in which the level of fuel 500 in the primary compartment 102 reaches the maximum filling level L3 of the primary compartment 102. In this situation, the fuel 500 begins to flow over the top of the bridge 104 into the secondary compartment 103. When the level of fuel 500 reaches the second predetermined filling level L2, the valve 200 is closed. At this time, the fuel tank 100 is no longer vented through the inwardly extending venting tube 206 and conduit 301. As a result, referring to FIG. 3 showing the fuel tank 100 in a tank fill situation, an increased pressure builds up in the vapour dome 400 in the fuel tank 100 and causes shut-off of the refueling operation.

Figure 4:
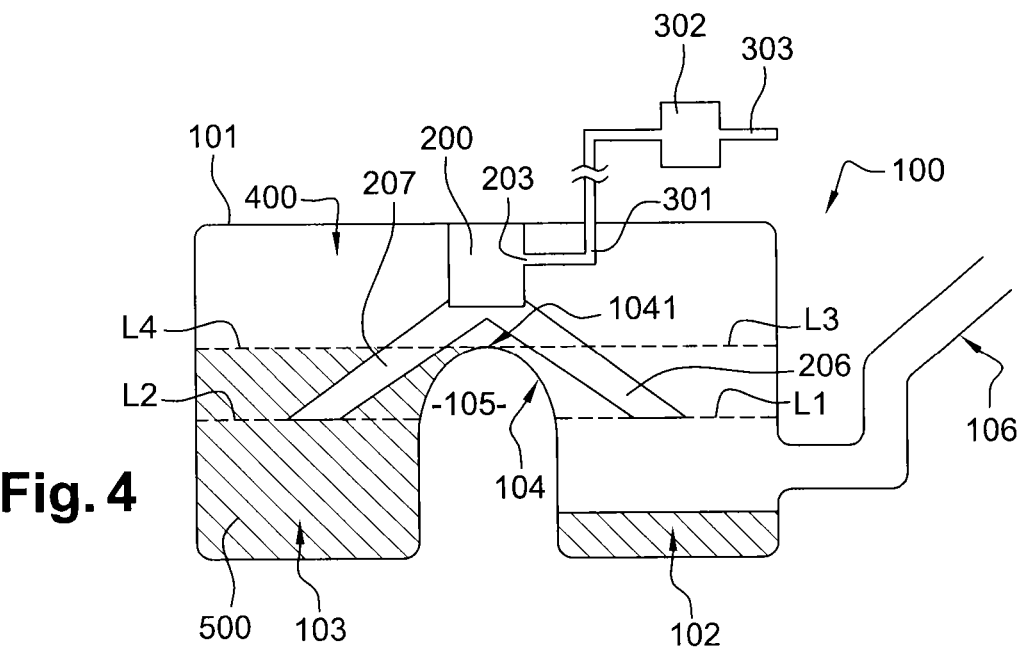
FIG. 4 shows a situation in which, for example immediately prior to a refueling procedure, a relatively large amount of fuel has passed into the secondary compartment of the fuel tank to reach the maximum filling level of the secondary compartment due to transverse acceleration acting on a motor vehicle.

From this tank fill situation shown in FIG. 3, the secondary compartment 103 is first to be consumed during engine operation since the pump feeding the engine (not shown) is located therein. Incidentally, it is quite possible for fuel 500 to flow from the primary compartment 102 over the top of the bridge 104 into the secondary compartment 103 when the motor vehicle in which the fuel tank 100 is fitted is subjected to, for example, transverse acceleration during travelling in bends of a road. Reference will be made to FIG. 4 showing the fuel tank 100 in a situation (also called "car rental" mode) in which the level of liquid is above L2 in the secondary compartment, under the influence of transverse acceleration. In the situation shown in FIG. 4, the valve 200 remains open, as the first predetermined filling level L1 is not reached. In other words, the extremity 2062 of the first venting tube is still open. In consequence, it is still possible to introduce fuel 500 from the tank filler pipe 106 into the primary compartment 102 because the valve 200 can carry out the venting of the fuel tank 100 through the inwardly extending venting tube 206 and conduit 301.

Reference will be made to a tank fill situation shown in FIG. 5 in which the refueling procedure ("car rental" refueling procedure) ends when the level of fuel 500 in the primary compartment 102 reaches the first predetermined filling level L1 at which the extremity 2062 of the first venting tube is closed. In this situation, the valve 200 switches from an opened position to a closed position. As a result, an increased pressure builds up in the vapour dome 400 in the fuel tank 100 and causes shut-off of the refueling operation.

Advantageously, the valve according to the invention further comprises means which confer on it the ability to act as a pressure liquid vapour separator. Examples of this configuration are illustrated in relation to FIGS. 7 to 9.

Figure 7:
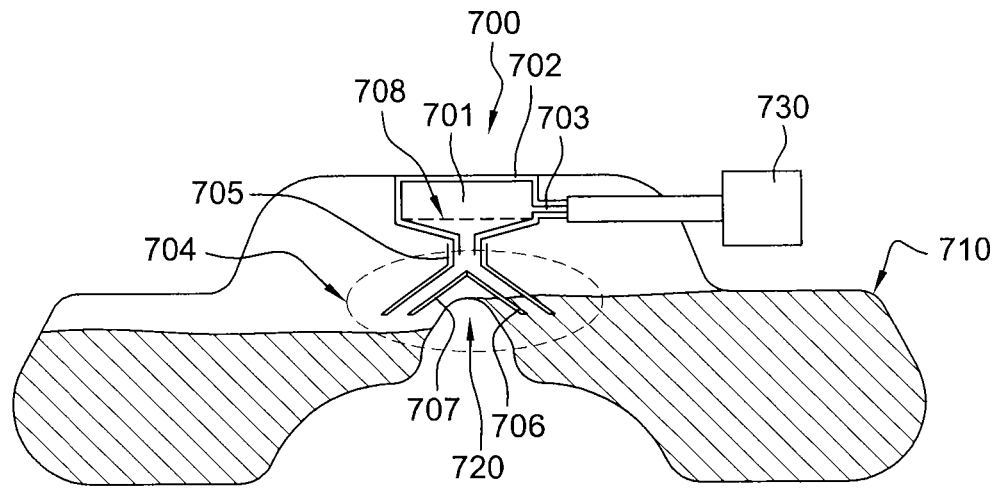
FIG. 7 shows a valve comprising a semi-permeable membrane according to a first preferred embodiment of the present invention.

In a first advantageous embodiment shown on FIG. 7, the valve 700 is disposed within the fuel tank 710. Preferably, the valve 700 is positioned at the centre of the tank, such that it extends above the bridge 720. The valve 700 comprises a chamber 701. The chamber 701 of the valve is provided with a cover 702. This cover 702 is advantageously connected to a venting circuit via an aperture 703. In the example of FIG. 7, the aperture 703 is connected through a conduit to the inlet of a storage canister 730.

In the example shown on FIG. 7, the valve 700 further comprises a refueling vent block 704. The refueling vent block 704 comprises:

a base 705 designed to be mounted at the bottom of the chamber 701;

a first venting tube 706 in charge of monitoring a level of fuel in the primary compartment of the tank; and a second venting tube 707 in charge of monitoring a level of fuel in the secondary compartment of the tank.

Advantageously, the valve 700 further comprises a semipermeable membrane 708 mounted inside the chamber 701 such that it extends between the first 706 and second 707 venting tubes and the aperture 703. The membrane 708 is configured such that:

it allows liquid vapour within the tank to flow from the first and second venting tubes to the aperture; and it prevents liquid in the tank to flow from the first and second venting tubes to the aperture.

Thus, the membrane 708 allows only fuel vapour to be transferred to the canister 730 so as to avoid contamination and pass through to the atmosphere.

Figure 8:
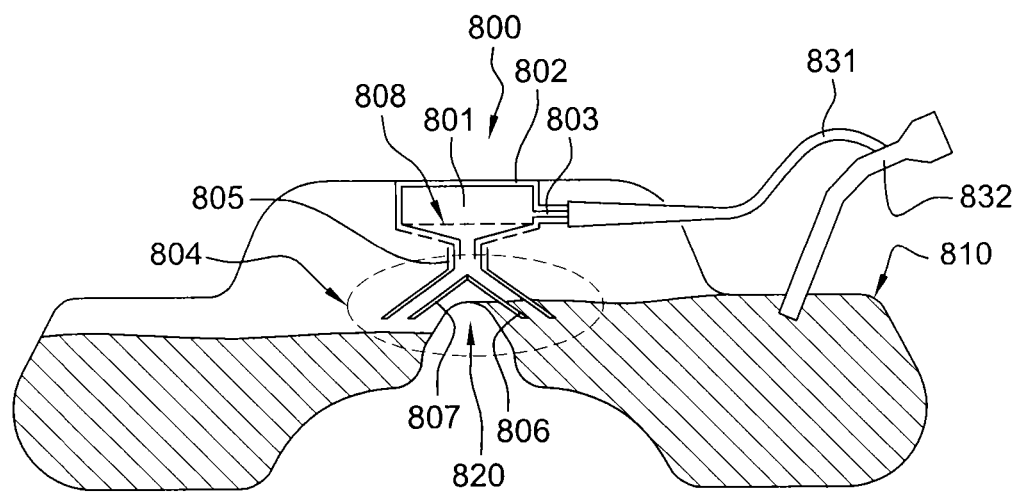
FIGS. 8 and 9 show a valve comprising a semi-permeable membrane according to a second preferred embodiment of the present invention.
Figure 9:
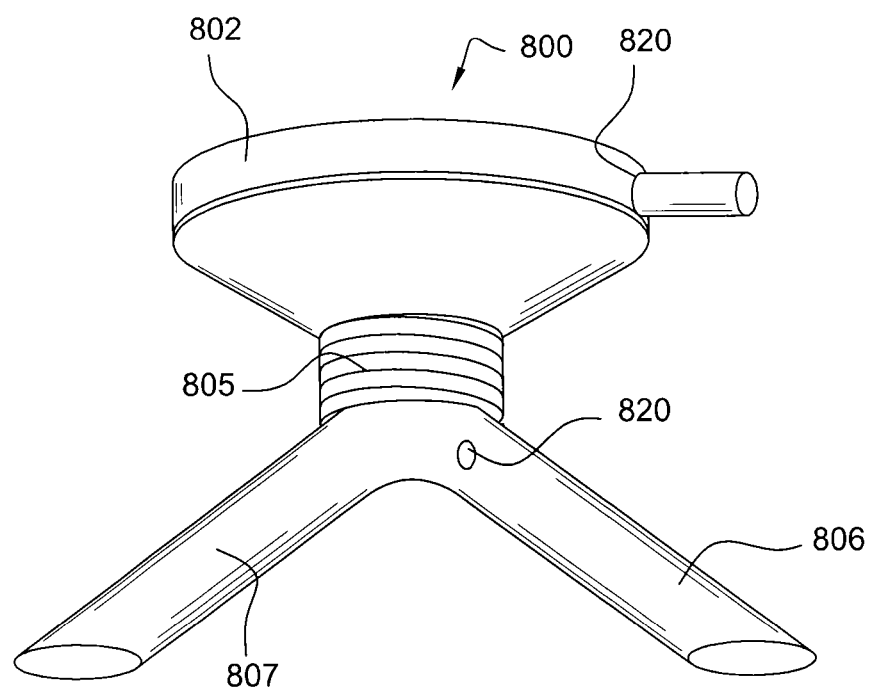

In a second advantageous embodiment shown on FIGS. 8 and 9, the valve 800 is disposed within the fuel tank 810. Preferably, the valve 800 is positioned at the centre of the tank, such that it extends above the bridge 820. The valve 800 comprises a chamber 801. The chamber 801 of the valve is provided with a cover 802. This cover 802 is advantageously connected to a venting circuit via an aperture 803. In the example of FIG. 8, the aperture 803 is connected to the inlet of a recirculation pipe 831 of a refueling tube 832.

In the example shown on FIG. 8, the valve 800 further comprises a refueling vent block 804. The refueling vent block 804 comprises:

a base 805 designed to be mounted at the bottom of the chamber 801;

a first venting tube 806 in charge of monitoring a level of fuel in the primary compartment of the tank; and a second venting tube 807 in charge of monitoring a level of fuel in the secondary compartment of the tank.

Advantageously, the valve 800 further comprises a semipermeable membrane 808 mounted inside the chamber 801 such that it extends between the first 806 and second 807 venting tubes and the aperture 803. In this particular embodiment, the membrane 808 discriminates liquid from flowing up the recirculation pipe 831.

Advantageously, as illustrated in the example of FIG. 9, the valve 800 further comprises a small bleed orifice 840. For example, this bleed orifice 840 is bored on the first venting tube 806. The bleed orifice 840 is used to minimize pressure spike at valve shut-off, in order to mitigate any fuel rising rapidly up the fill pipe and exiting the pipe as a result. This bleed orifice (23) could be tuned to optimize refueling performance. The valve 800 can comprise other bleed orifices placed at strategic locations in the refueling vent block 804.

The invention claimed is:

1. A system for venting a tank, said system comprising a tank with a valve, a primary compartment and a secondary compartment connected together in a communicating manner by a bridge, wherein the valve comprises:
   a) a chamber provided with a cover, which extends at least partly into the tank and is connected via an upper venting aperture to a venting circuit;
   b) first means for monitoring a level of liquid in the primary compartment;
   c) second means for monitoring a level of liquid in the secondary compartment;
   the valve being configured to be closed when:
      said first means detect that the level of liquid in the primary compartment is equal to or higher than a first predetermined filling level; and
      said second means detect that the level of liquid in the secondary compartment is equal to or higher than a second predetermined filling level.

2. A system according to claim 1, wherein the first and second predetermined filling levels are lower than the level of the top of the bridge.

3. A system according to claim 1, wherein the valve is mounted within the tank such that its chamber extends above the bridge.

4. A system according to claim 1, wherein:
   said first means comprise a first venting tube having one extremity which opens into the primary compartment at a level which corresponds to the first predetermined filling level, and an other extremity which opens into the chamber, and
   said second means comprise a second venting tube having one extremity which opens into the secondary compartment at a level which corresponds to the second predetermined filling level, and an other extremity which opens into the chamber.

5. A system according to claim 1, further comprising a device with a ROV (roll over valve) configured to cooperate with the upper venting aperture.

6. A valve suitable for venting a tank, said valve comprising:
   a chamber provided with a cover and with an upper venting aperture suitable for being connected to a venting circuit;
   first means for monitoring a level of liquid in a primary compartment of said tank;
   second means for monitoring a level of liquid in a secondary compartment of the tank;
   the valve being configured to be closed when:
   said first means detect that the level of liquid in the primary compartment is equal to or higher than a first predetermined filling level; and
   said second means detect that the level of liquid in the secondary compartment is equal to or higher than a second predetermined filling level.

7. A valve according to claim 6, wherein:
   said first means comprise a first venting tube having one extremity which opens into the primary compartment at a level which corresponds to the first predetermined filling level, and an other extremity which opens into the chamber, and
   said second means comprise a second venting tube having one extremity which opens into the secondary compartment at a level which corresponds to the second predetermined filling level, and an other extremity which opens into the chamber.

8. A valve according to claim 7, said valve comprising a base designed for supporting the first and second venting tubes and for connecting them to the chamber of the valve.

9. A valve according to claim 8, wherein the base and the first and second venting tubes form one block.

10. A valve according to claim 8, wherein the base and the first and second venting tubes are made by injection moulding a plastic.

11. A valve according to claim 7, wherein the first and second venting tubes are made of plastic.

12. A valve according to claim 7, said valve comprising at least one semi-permeable membrane mounted inside the chamber such that said semi-permeable membrane extends between the first and second venting tubes and the upper venting aperture, the semi-permeable membrane being configured such that:
   said semi-permeable membrane allows liquid vapour within the tank to flow from the first and second venting tubes to the upper venting aperture; and
   said semi-permeable membrane prevents liquid in the tank to flow from the first and second venting tubes to the upper venting aperture.

13. A valve according to claim 6, said valve comprising at least one bleed orifice.

14. A saddle fuel tank equipped with a valve according to claim 6.

* * * * *